(12) United States Patent
Takahashi

(10) Patent No.: US 7,116,867 B2
(45) Date of Patent: Oct. 3, 2006

(54) MULTIPLE SPLIT OPTICAL WAVEGUIDE

(75) Inventor: Fumio Takahashi, Kanagawa (JP)

(73) Assignee: NHK Spring Co., Ltd., Yokohama (JP)

( * ) Notice: Subject to any disclaimer, the term of this patent is extended or adjusted under 35 U.S.C. 154(b) by 27 days.

(21) Appl. No.: 10/483,507

(22) PCT Filed: Apr. 12, 2002

(86) PCT No.: PCT/JP02/03698

§ 371 (c)(1),
(2), (4) Date: Jan. 12, 2004

(87) PCT Pub. No.: WO03/009030

PCT Pub. Date: Jan. 30, 2003

(65) Prior Publication Data

US 2004/0218869 A1 Nov. 4, 2004

(30) Foreign Application Priority Data

Jul. 13, 2001 (JP) ............................. 2001-214140

(51) Int. Cl.
*G02B 6/26* (2006.01)
(52) U.S. Cl. .......................................... 385/45; 385/39
(58) Field of Classification Search .................. 385/45, 385/39, 15, 42, 43, 44, 46, 14
See application file for complete search history.

(56) References Cited

U.S. PATENT DOCUMENTS 4,760,580 A * 7/1988 Thompson et al. ............ 372/50
6,282,343 B1 * 8/2001 Kim et al. ..................... 385/45

FOREIGN PATENT DOCUMENTS

| EP | 0 513 556 A1 | 11/1992 |
| EP | 0 668 515 A1 | 8/1995 |
| JP | 60032030 A * | 2/1985 |
| JP | 4-289803 | 10/1992 |
| JP | 3030108 | 2/2000 |

OTHER PUBLICATIONS

English Translation of JP60-32030.*
English Language Abstract, Japanese Patent Publication 4-289803, Published Oct. 14, 1992, and Japanese Patent No. 3030108, Granted Feb. 4, 2000.

* cited by examiner

*Primary Examiner*—Sung Pak
(74) *Attorney, Agent, or Firm*—MacPherson Kwok Chen & Heid LLP

(57) ABSTRACT

Disclosed is a multiple split optical waveguide in which a branch waveguide path at an output end of a branch part of a first stage defines an acute angle with respect to an input waveguide path, and a branch waveguide path at an input end of a branch part of an n-th stage is no more inclined toward a central axial line defined by an extension line of the input waveguide path than a branch waveguide path at an input end of a branch part of an (n+1)-th stage, n being an integer equal to or greater than two. Thus, the waveguide paths are prevented from spreading beyond the first branch angle, and it becomes easier to bring the outer waveguide guide paths back toward the center. This prevents an increase in the variations in length between the outer and inner waveguide paths.

15 Claims, 3 Drawing Sheets

MULTIPLE SPLIT OPTICAL WAVEGUIDE

TECHNICAL FIELD

The present invention relates to a multiple split optical waveguide including three or more stages of Y branch parts formed in a substrate each splitting incident light evenly into two parts.

BACKGROUND OF THE INVENTION

A conventional multiple split optical waveguide 31 having a tree configuration includes a plurality of stages of Y branch parts formed in a substrate each Y branch part splitting an incident light beam evenly into two parts. An incident light beam is received from one end of the substrate, and a plurality of split light beams exit from the other end of the substrate. In such an optical waveguide, as shown in FIG. 4, the central axial line of the incident light beam of the Y branch part 32 of the first stage is in parallel with those of the Y branch parts of the following stages. Thereby, the waveguide paths are all provided with a same length.

The waveguide path which is split by each Y branch part is brought back into a parallel direction before reaching the Y branch part of the subsequent stage. Because increasing the curvature of the waveguide path causes an increase in the transmission loss, the waveguide paths are required to be curved without involving a part having any large curvature. This causes the length of each waveguide path to be increased, and therefore the size of the substrate to be increased. This problem gets particularly pronounced as the number of stages of Y branch parts increases. In particular, as the number of stages increases, the waveguide paths which are split near the base end of the substrate or the upstream part of the waveguide paths are required to be separated from each other by a greater distance, and this contributes to the increase in the length of each waveguide path and the size of the substrate.

As shown in FIG. 5, it is also conceivable to reduce the distance between adjacent waveguide paths or increase the density of the waveguide paths in a multiple split optical waveguide 41 having a tree configuration so that the waveguide paths may be branched out at a relatively short distance. The branch waveguide paths split by the Y branch parts of the last stage are curved before reaching the output ports on the other end of the substrate. Because the waveguide paths are curved only after being split by the Y branch parts of the last stage, the length of each waveguide path can be made shorter than those shown in FIG. 4, but the loss increases and the unevenness in the lengths of the waveguide paths causes variations in the outputs between different output ports.

According to the proposal disclosed in Japanese patent No. 3,030,108, the central axial line of the incident light of the Y branch part of the first stage is not in parallel with those of the second and subsequent stages, and the angles formed between the central axial line of the incident light beam of the Y branch part of the first stage and those of the outer most branch parts of the third and any subsequent stages are made progressively greater toward the later stages. This arrangement eliminates the need to excessively curve the waveguide paths, and the length of each waveguide path to be reduced without involving any significant loss due to large curvatures between the Y branch parts of adjacent stages.

However, according to the arrangement disclosed in Japanese patent No. 3,030,108, the outer waveguide paths tend to spread apart from adjacent waveguide paths toward the later stages, and this creates the need to significantly curve the waveguide paths to put the waveguide paths which are spread apart from each other toward each other. Therefore, as the number of stages of Y branch parts increases, the loss due to the curvature of the outer waveguide paths may increase. If the curvature of the outer waveguide paths is kept small, the length of each waveguide path increases, and the size of the substrate increases. The spreading apart of the outer waveguide paths causes the length of each waveguide path to vary between the inner and outer waveguide paths, and this not only increases the loss but also increases the variations of loss between different waveguide paths.

BRIEF SUMMARY OF THE INVENTION

In view of such problems of the prior art, a primary object of the present invention is to provide a multiple split optical waveguide which allows the distance between the input and output ends to be reduced and the substrate to be made compact.

A second object of the present invention is to provide a multiple split optical waveguide which is suitable for compact design and minimizes the variations in the losses between the different waveguide paths.

A third object of the present invention is to provide a multiple split optical waveguide which is simple in structure and compact in design.

According to the present invention, such an object can be accomplished by providing a multiple split optical waveguide including a substrate having a plurality of waveguide paths defined therein in a tree configuration, the waveguide paths including an input waveguide path, a plurality of stages of branch parts and branch waveguide paths extending from the branch parts, the branch waveguide paths including output waveguide paths extending from branch parts of a final stage, wherein: a branch waveguide path at an output end of a branch part of a first stage defines an acute angle with respect to an input waveguide path, and a branch waveguide path at an input end of a branch part of an n-th stage is no more inclined toward a central axial line defined by an extension line of the input waveguide path than a branch waveguide path at an input end of a branch part of an (n+1)-th stage, n being an integer equal to or greater than two.

Thus, the waveguide paths are prevented from spreading beyond the first branch angle $\theta_0$, and it becomes easier to bring the outer waveguide guide paths back toward the center. The reduction in the spread of the outer waveguide paths prevents an increase in the variations in length between the outer and inner waveguide paths.

In particular, if the angle $\theta$ which is formed between the central axial line of the incident light beam of the Y branch part of the first stage and the central axial line of the incident light beam of the outer most branch part of the third or any subsequent stage is equal to or less than the angle $\theta_0$, the layout of the downstream parts of the waveguide paths and subsequent branch parts is simplified. By setting the central axial line of the incident light beam of the inner branch part of the third or any subsequent stage in parallel with the incident light beam of the Y branch part of the first stage, or, if necessary, inclined toward the central axial line, equalizing the lengths of the inner and outer waveguide paths is simplified even further.

If the branch waveguide paths of each Y branch part of the second or any subsequent stage are symmetric to each other about the central axial line of the incident light beam over a length of 200 μm or greater, and asymmetric in a part downstream thereof in such a manner that the losses of the branch waveguide paths are substantially identical to each other, the length of each waveguide path can be adjusted without creating differences in loss between different waveguide paths, and the freedom in the pattern layout of the substrate is improved.

In the case of an eight-way split optical waveguide, a branch waveguide path at an output end of a branch part of the first stage should define an acute angle with respect to an input waveguide path, and a branch waveguide path at an input end of a branch part of the second stage should be no more inclined toward a central axial line defined by an extension line of the input waveguide path than a branch waveguide path at an input end of a branch part of the third stage.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
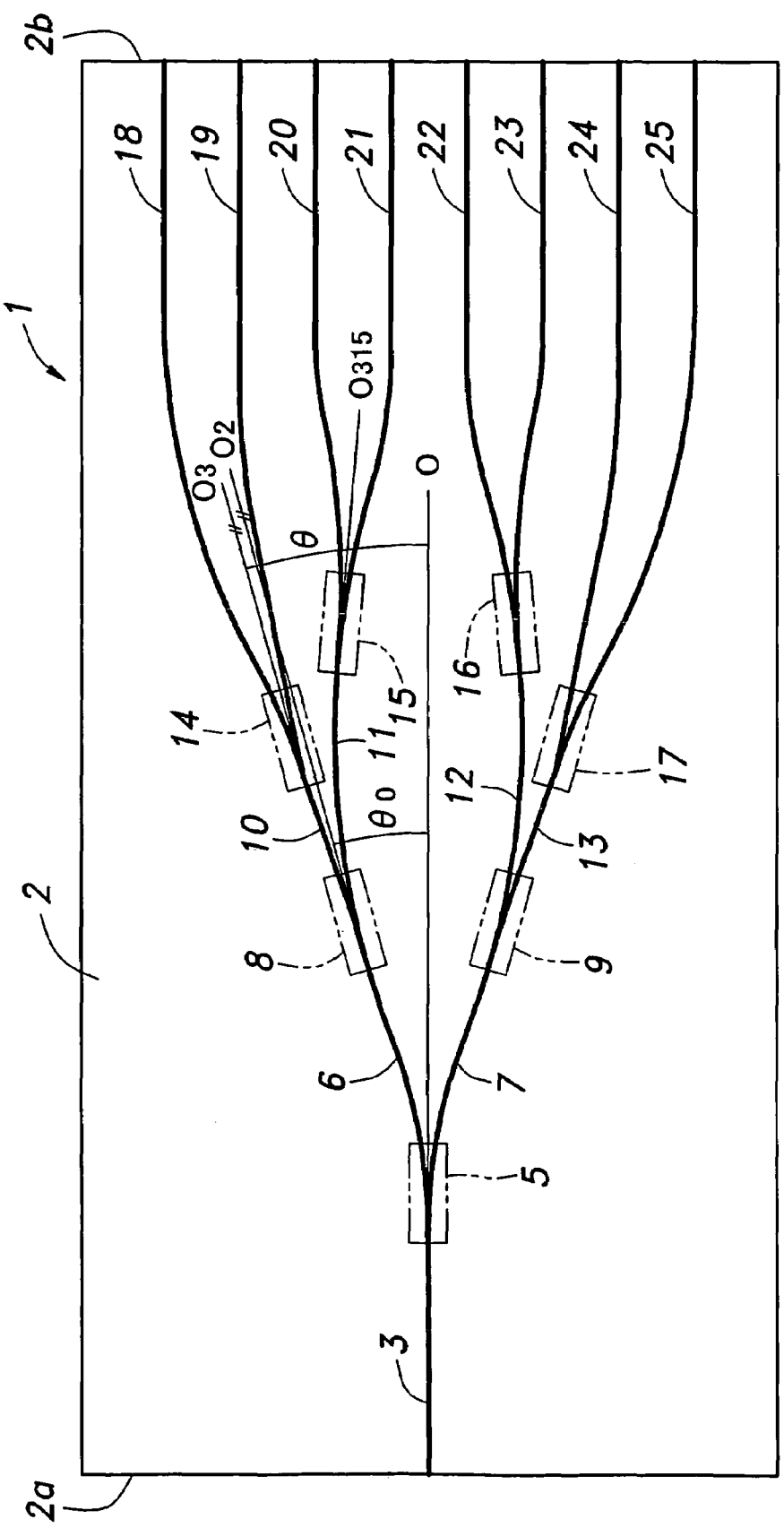
FIG. 1 is a plan view of an eight-way branch optical waveguide 1 embodying the present invention.

FIG. 1 is a plan view of an eight-way branch optical waveguide 1 embodying the present invention. A plurality of waveguide paths are formed in a glass substrate in a per se known manner, and include an input waveguide path 3 extending linearly from an end 2a of the substrate 2 and reaching a Y branch part 5 of the first stage. Two branch waveguide paths 6 and 7 extend from the Y branch part 5 of the first stage, and somewhat curve away from each other and reach two Y branch parts 8 and 9 of the second stage, respectively. Each of the Y branch parts 8 and 9 of the second stage splits the corresponding waveguide path of the input end into two parts each of which reaches a corresponding one of four Y branch parts 14 to 17 of the third stage. Eight branch waveguide paths 18 to 25 split by the Y branch parts 14 to 17 of the third stage and extending therefrom reach the corresponding exit ports on the other end 2b of the substrate 2 as output waveguide paths. The eight-way branch waveguide 1 as a whole is symmetric about the axial line of the incident light of the Y branch part 5 of the first stage.

Suppose that the angle formed between the central axial line O of the incident light beam of the Y branch part 5 of the first stage or an extension line of the input waveguide path 3 and the central axial line $O_2$ of the incident light beam of each of the Y branch parts 8 and 9 of the second stage or an extension line of each of the branch waveguide paths 6 and 7 is $\theta_0$. Suppose also that the angle formed between the central axial line O of the input waveguide path 3 and the central axial line $O_3$ of the incident light beam of each of the outer most Y branch parts 14 and 17 of the third stage or an extension line of each of the input waveguide paths 10 and 13 is θ. Then, $\theta_0 = \theta$. In other words, the central axial line $O_2$ is in parallel with the central axial line $O_3$.

Figure 2:
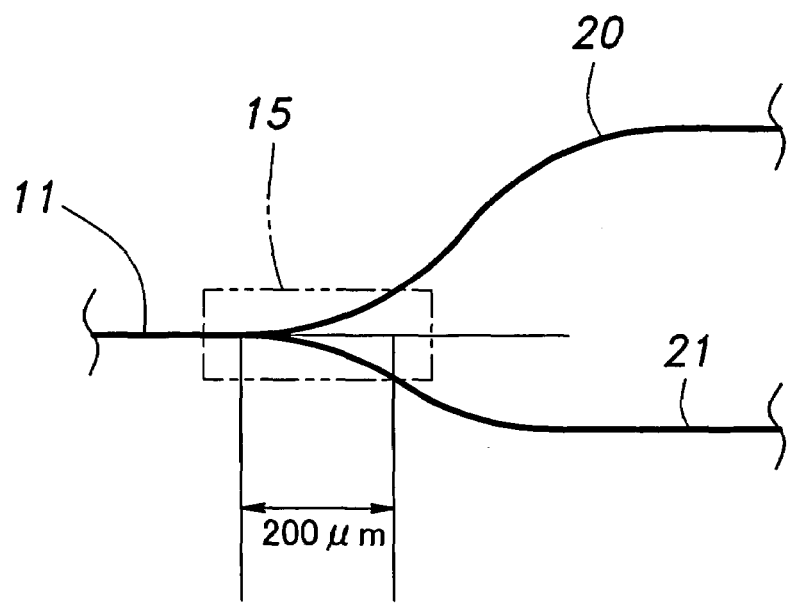
FIG. 2 is a fragmentary enlarged view of an essential part of FIG. 1.
Figure 3:
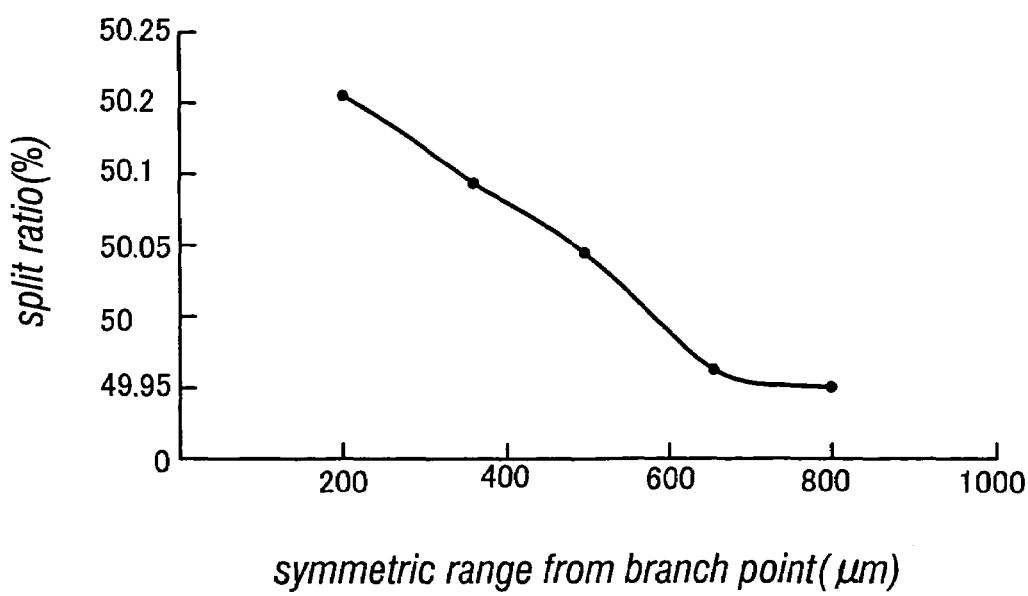
FIG. 3 is a graph showing the relationship between the symmetric range and split ratio in a Y branch part.

As shown in FIG. 2 in an enlarged and somewhat exaggerated view, each of the Y branch parts, for instance one of the inner Y branch parts 15 (16) is symmetric with respect to the central axial line over a range of 200 μm extending from the branch point 15a (16a), but ceases to be so downstream of that part. This simplifies the adjustment of the length of each waveguide path. It may create a concern that the asymmetric arrangement of the waveguide paths could prevent the even distribution (1 to 1 or 50—50%) of the light between the branch waveguide paths. However, it was found that the distribution ratio is no worse than 50.2–49.8% if the symmetric range extends at least 200 μm from the branch point as shown in FIG. 3, and practically no problem arises.

Referring to FIG. 1, each of the inner Y branch parts for instance the Y branch part 15 (16) has a central axial line $O_{315}$ which inclines toward the central axial line O of the incident light. If desired, the central axial line $O_{315}$ may extend in parallel with the central axial line O. This even further simplifies the adjustment of the length of each of the waveguide paths. The branch waveguide paths 6, 7, 10 to 13, and 18 to 25 are formed by curves or combinations of straight lines and curves. If the curves consist of arcs (segments of circles), the adjustment of the length of each of the waveguide paths is simplified as compared to the case of using other curves.

Figure 4:
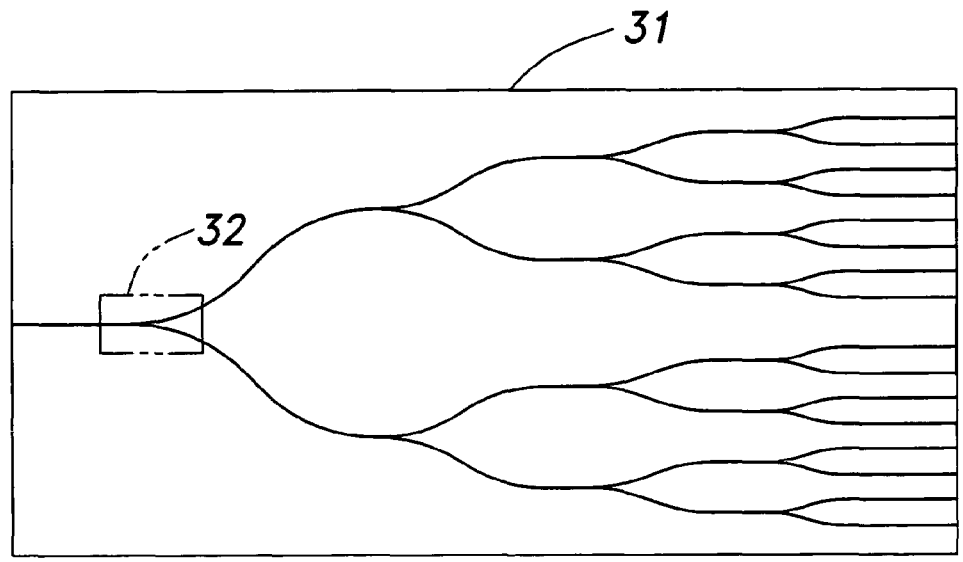
FIG. 4 is a plan view showing a conventional multiple branch optical waveguide.
Figure 5:
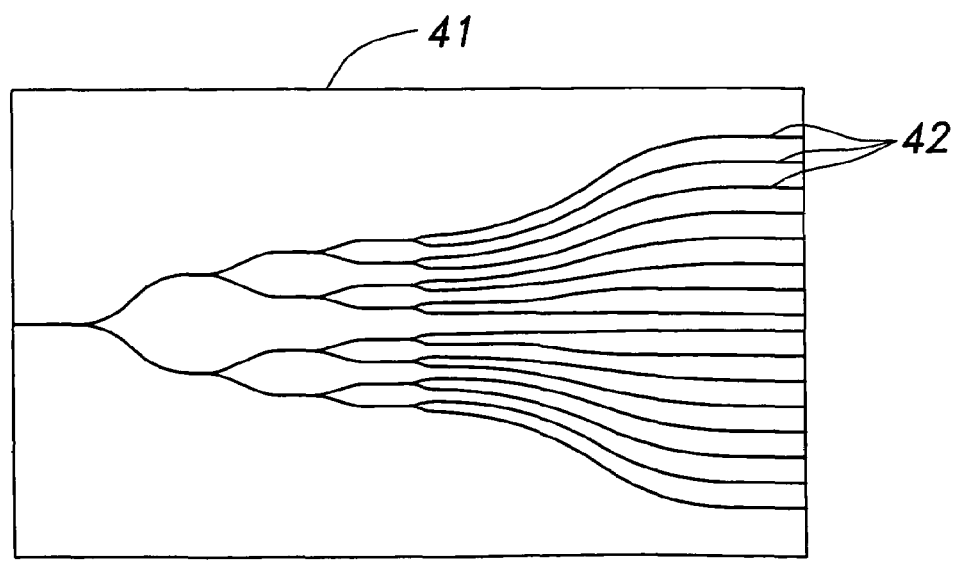
FIG. 5 is a plan view showing a conventional multiple branch optical waveguide.

The table given below compares the length of the substrate between the multiple branch waveguide 1 of the present invention and the conventional multiple branch waveguide shown in FIG. 4 for a given transmission loss, and the insertion losses for a given length of the substrate.

TABLE 2

|  | invention | conventional | remarks |
|---|---|---|---|
| length | 16 mm | 25 mm | same loss (9.9 dB)] |
| insertion loss | 9.5 dB | 9.9 dB | same substrate length (25 mm) |

As can be seen from this table, the multiple branch waveguide of the present invention allows the substrate length to be reduced by approximately 36% for a given loss, and the loss to be reduced by approximately 0.4 dB for a given substrate length.

The foregoing description was directed to an eight-way optical waveguide, but the present invention is not limited to this embodiment but is equally applicable to other waveguides such as 16-, 32- and 64-way optical waveguides. In such a case, the central axial line of the incident light of the outer Y branch part of the fourth or more downstream stage may be in parallel with the central axial line of the incident light beam of the Y branch part of the second stage.

The angle formed between the central axial line of the incident light beam of the first stage and the central axial line of the incident light beam of the outer most Y branch part of each stage may also be smaller than the angle formed between the central axial line of the incident light beam of the first stage and the central axial line of the incident light beam of each Y branch part of the second stage. In such a case, the design work may get somewhat complicated, but similar advantages can be gained.

The substrate used in the embodiment described above consisted of glass, but may also consist of quartz, $LiNbO_3$ containing Ti diffused therein, compound semiconductor or plastic material.

As can be appreciated from the foregoing description, according to the preferred embodiment of the present invention, in a multiple split optical waveguide including three or more Y branch parts in a substrate each splitting incident light beam evenly into two parts, a central axial line of an incident light beam of a Y branch part of the second or any subsequent stage is inclined with respect to a central axial line of an incident light beam of a Y branch part of the first stage in such a manner that a certain angle $\theta_0$ is formed between the central axial line of the incident light beam of the Y branch part of the first stage and the central axial line of an incident light beam of a Y branch part of the second stage, and a certain angle $\theta$ which is equal to or less than the angle $\theta_0$ is formed between the central axial line of the incident light beam of the Y branch part of the first stage and a central axial line of an incident light beam of an outer most branch part of the third or any subsequent stage. Therefore, the waveguide paths are prevented from spreading beyond the first branch angle $\theta_0$, and it becomes easier to bring the outer waveguide guide paths back toward the center. The reduction in the spread of the outer waveguide paths prevents an increase in the variations in length between the outer and inner waveguide paths. Thus, the distance between the input and output ends can be reduced and the substrate can be made compact without increasing the variations in the losses of the different waveguide paths of the multiple split optical waveguide. In particular, if the angle $\theta$ which is formed between the central axial line of the incident light beam of the Y branch part of the first stage and the central axial line of the incident light beam of the outer most branch part of the third or any subsequent stage is equal to or less than the angle $\theta_0$, the layout of the downstream parts of the waveguide paths and subsequent branch parts is simplified. If the branch waveguide paths of each Y branch part of the second or any subsequent stage are symmetric to each other about the central axial line of the incident light beam over a length of 200 μm or greater, and asymmetric in a part downstream thereof in such a manner that the losses of the branch waveguide paths are substantially identical to each other, the length of each waveguide path can be adjusted without creating differences in loss between different waveguide paths, and the freedom in the pattern layout of the substrate is improved. If part of or all of the inner Y branch parts of the third or any subsequent stage are inclined toward the central axial line of the incident light beam of the Y branch part of the first stage, variations in length between inner and outer waveguide paths can be reduced even further.

Although the present invention has been described in terms of preferred embodiments thereof, it is obvious to a person skilled in the art that various alterations and modifications are possible without departing from the scope of the present invention which is set forth in the appended claims.

The invention claimed is:

1. A multiple split optical waveguide including a substrate having a plurality of waveguide paths defined therein in a tree configuration, said waveguide paths including an input waveguide path extending along a central axial line, a plurality of stages of branch parts and branch waveguide paths extending from said branch parts, said branch waveguide paths including output waveguide paths extending from branch parts of a final stage, wherein:

a branch waveguide path at an output end of a branch part of a first stage extends to an input end of a branch part of a second stage, the input end of the branch part of the second stage defining a non-zero acute angle with respect to the central axial line, wherein light entering the input end of the branch part of the second stage is split and is output from a plurality of branch wave guide paths extending from the branch part of the second stage, and a branch waveguide path at an input end of an outermost branch part of an n-th stage defines an outward inclination angle with respect to the central axial line which is equal to or greater than a corresponding outward inclination angle defined by a branch waveguide path at an input end of an outermost branch part of an (n+1)-th stage with respect to the central axial line, n being an integer equal to or greater than two;

wherein the input waveguide path extends along the central axial line to the branch part of the first stage.

2. A multiple split optical waveguide according to claim 1, wherein a branch waveguide path at an input end of an outer branch part of an m-th stage is no less outwardly inclined with respect to said central axial line than a branch waveguide path at an input end of an inner branch part of the same stage, m being an integer equal to or greater than three.

3. A multiple split optical waveguide according to claim 1, wherein a pair of branch waveguide paths at an output end of each branch part are symmetric to each other about an extension line of a waveguide path at an input end of said branch part over a prescribed distance from a branch point of said branch part, and cease to be symmetric beyond this distance.

4. A multiple split optical waveguide according to claim 3, wherein said distance is no less than 200 μm.

5. A multiple split optical waveguide according to claim 1, wherein output waveguide paths extending from branch parts of a final stage are all parallel to said central axial line.

6. A multiple split optical waveguide according to claim 1, wherein at least one of a plurality of branch parts of an m-th stage is substantially axially offset from an adjacent branch parts of the same stage associated with a common branch part of a preceding stage along an extension line of a branch waveguide path at an input end of said common branch part.

7. An eight-way split optical waveguide including a substrate having a plurality of waveguide paths defined therein in a tree configuration, said waveguide paths including an input waveguide path extending along a central axial line, three stages of branch parts and branch waveguide paths extending from said branch parts, said branch waveguide paths including eight output waveguide paths extending from branch parts of the third stage, wherein:

a branch waveguide path at each output end of a branch part of a first stage extends to an input end of a branch part of a second stage, the input end of the branch part of the second stage defining a non-zero acute first angle with respect to the central axial line, wherein light entering the input end of the branch part of the second stage is split and is output from a plurality of branch wave guide paths extending from the branch part of the second stage, and a branch waveguide path at an input end of an outer branch part of a third stage corresponding to an output end of a branch part of the second stage defines a second angle with respect to the central axial line, said second angle being equal to or less than the first angle;

wherein the input waveguide path extends along the central axial line to the branch part of the first stage.

8. An eight-way split optical waveguide according to claim 7, wherein a branch waveguide path at an input end of an outer branch part of the third stage is substantially in parallel with the branch waveguide path at an input end of a corresponding branch part of the second stage, and a branch waveguide path at an input end of an inner branch part of the third stage is more inclined toward the central axial line.

9. An eight-way split optical waveguide according to claim 8, wherein the branch waveguide path at an input end of an inner branch part of the third stage is substantially in parallel with said central axial line.

10. An eight-way split optical waveguide according to claim 8, wherein a pair of branch waveguide paths at an output end of each branch part are symmetric to each other about an extension line of a waveguide path at an input end of said branch part over a prescribed distance from a branch point of said branch part, and cease to be symmetric beyond this distance.

11. An eight-way split optical waveguide according to claim 10, wherein said distance is no less than 200 μm.

12. An eight-way split optical waveguide according to claim 7, wherein output waveguide paths extending from branch parts of the third stage are all parallel to said central axial line.

13. An eight-way split optical waveguide according to claim 7, wherein the two branch parts of the second stage are axially aligned with each other with respect to the central axial line, and two of the branch parts of the third stage are each substantially axially offset from an adjacent branch parts of the same stage associated with a common branch part of the second stage along an extension line of the branch waveguide path at an input end of said common branch part of the second stage.

14. A multiple split optical waveguide according to claim 1, wherein each branch part includes an input path and a pair of output paths which are symmetric about each other about an extension line of the input path at least over a prescribed distance from a branch point of said branch part.

15. A multiple split optical waveguide according to claim 7, wherein each branch part includes an input path and a pair of output paths which are symmetric about each other about an extension line of the input path at least over a prescribed distance from a branch point of said branch part.

* * * * *